US009806898B2

(12) United States Patent
Zhang et al.

(10) Patent No.: US 9,806,898 B2
(45) Date of Patent: Oct. 31, 2017

(54) SERVICE CONTINUITY WITH EMBMS SUPPORT ON NON-SELF-STANDING CARRIER FREQUENCY

(71) Applicant: QUALCOMM Incorporated, San Diego, CA (US)

(72) Inventors: Xiaoxia Zhang, San Diego, CA (US); Jun Wang, Poway, CA (US); Xipeng Zhu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 14/769,096

(22) PCT Filed: Apr. 2, 2014

(86) PCT No.: PCT/CN2014/074656
§ 371 (c)(1),
(2) Date: Aug. 19, 2015

(87) PCT Pub. No.: WO2014/161491
PCT Pub. Date: Oct. 9, 2014

(65) Prior Publication Data
US 2015/0381378 A1 Dec. 31, 2015

(30) Foreign Application Priority Data

Apr. 4, 2013 (WO) ................ PCT/CN2013/073764

(51) Int. Cl.
*H04L 12/18* (2006.01)
*H04W 72/00* (2009.01)
(Continued)

(52) U.S. Cl.
CPC ........... *H04L 12/189* (2013.01); *H04W 48/16* (2013.01); *H04W 72/005* (2013.01);
(Continued)

(58) Field of Classification Search
None
See application file for complete search history.

(56) References Cited

U.S. PATENT DOCUMENTS

2012/0213130 A1    8/2012  Zhang et al.
2014/0086173 A1*   3/2014  Sadeghi ................ H04L 5/005
                                                    370/329
(Continued)

FOREIGN PATENT DOCUMENTS

CN      101510867 A     8/2009
CN      101932116 A    12/2010
(Continued)

OTHER PUBLICATIONS

Alcatel-Lucent Shanghai Bell, et al., "Issues of MBMS Service Provision Under CA", 3GPP Draft; R2-112229, 3rd Generation Partnership Project (3GPP), Mobile Competence Centre; 650, Route Des Lucioles; F-06921 Sophia-Antipolis Cedex; France, vol. RAN WG2, No. Shanghai, China; Apr. 11, 2011, Apr. 4, 2011 (Apr. 4, 2011), XP050494394.
(Continued)

*Primary Examiner* — Diane Lo
(74) *Attorney, Agent, or Firm* — Anthony R. Morris

(57) ABSTRACT

A method, an apparatus, and a computer program product for wireless communication are provided. The apparatus may be a UE. The UE receiving information indicating an available MBMS service, a non-self-standing carrier frequency on which the available MBMS service is provided, and one or more PCC frequencies to which the non-self-standing carrier frequency is attached. The UE selects a preference for one PCC frequency of the one or more PCC frequencies in order to obtain information for receiving the available MBMS service on the non-self-standing carrier frequency. The UE receives the available MBMS service on
(Continued)

the non-self-standing carrier frequency based on the obtained information.

30 Claims, 15 Drawing Sheets

(51) Int. Cl.
    *H04W 48/16*     (2009.01)
    *H04W 72/04*     (2009.01)
    *H04W 76/04*     (2009.01)
    *H04W 48/12*     (2009.01)
    *H04L 5/00*     (2006.01)

(52) U.S. Cl.
    CPC ..... *H04W 72/0453* (2013.01); *H04W 76/046* (2013.01); *H04L 5/001* (2013.01); *H04L 5/0053* (2013.01); *H04W 48/12* (2013.01)

(56) References Cited

U.S. PATENT DOCUMENTS

| | | | |
|---|---|---|---|
| 2014/0211685 A1* | 7/2014 | Kim | H04W 36/06 370/312 |
| 2014/0286223 A1* | 9/2014 | Yu | H04W 4/08 370/312 |
| 2015/0146604 A1* | 5/2015 | Kim | H04W 4/06 370/312 |
| 2016/0007319 A1* | 1/2016 | He | H04W 36/14 370/280 |

FOREIGN PATENT DOCUMENTS

| | | |
|---|---|---|
| CN | 102595330 A | 7/2012 |
| CN | 102611994 A | 7/2012 |

OTHER PUBLICATIONS

Qualcomm Incorporated et al., "Consideration of Service Continuity with eMBMS Support on NCT", 3GPP Draft, R2-131237_SERVECONTINUITYNCT, 3rd Generation Partnership Project (3GPP), Mobile Competence Centre, 650, Route Des Lucioles, F-06921 Sophia-Antipolis Cedex, France, vol. RAN WG2, No. Chicago, USA, Apr. 15, 2013-Apr. 19, 2013, Apr. 6, 2013 (Apr. 6, 2013), XP050699456, Retrieved from the Internet: URL: http: //www.3gpp.org/ftp/tsg_ran/WG2_RL2/TSGR2_81bis/Docs/.

Qualcomm Incorporated, et al., "Consideration of EMBMS Support on NCT", 3GPP Draft; R2-131235_EMBMSONNCT, 3rd Generation Partnership Project (3GPP), Mobile Competence Centre; 650, Route Des Lucioles; F-06921 Sophia-Antipolis Cedex; France, vol. RAN WG2, No. Chicago, USA; Apr. 15, 2013-Apr. 19, 2015, Apr. 6, 2013 (Apr. 6, 2013), XP050699454, pp. 4.

Supplementary European Search Report—EP14778365—Search Authority—Munich—dated Jul. 21, 2016.

Zte, et al., "MBMS Service Discovery in Carrier Aggregation Deployment", 3GPP Draft; R2-112897, 3rd Generation Partnership Project (3GPP), Mobile Competence Centre ; 650, Route Des Lucioles ; F-06921 Sophia-Antipolis Cedex ; France, vol. RAN WG2, No. Barcelona, Spain; May 9, 2011, May 3, 2011 (May 3, 2011), pp. 1-3, XP050495286.

International Search Report and Written Opinion—PCT/CN2013/073764—ISA/EPO—dated Jan. 9, 2014.

International Search Report and Written Opinion—PCT/CN2014/074656—ISA/EPO—dated Jul. 15, 2014.

* cited by examiner

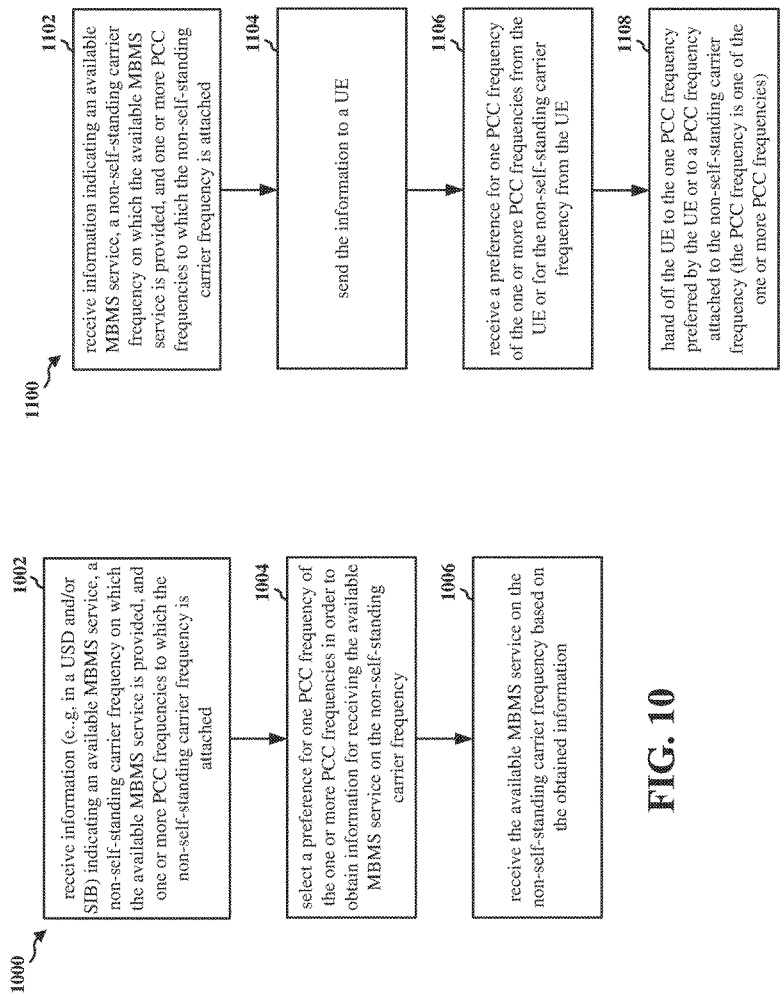

SERVICE CONTINUITY WITH EMBMS SUPPORT ON NON-SELF-STANDING CARRIER FREQUENCY

CROSS-REFERENCE TO RELATED APPLICATION(S)

The present Application is a 35 U.S.C. §371 National Phase Application of PCT Application No. PCT/CN2014/074656 entitled "SERVICE CONTINUITY WITH EMBMS SUPPORT ON NON-SELF-STANDING CARRIER FREQUENCY" filed Apr. 2, 2014, in the Receiving Office of China (RO/CN), which claims priority to PCT Application No. PCT/CN2013/073764 entitled "SERVICE CONTINUITY WITH EMBMS SUPPORT ON NON-SELF-STANDING CARRIER FREQUENCY" filed Apr. 4, 2013, in the Receiving Office of China (RO/CN), both of which are assigned to the Assignee hereof and hereby expressly incorporated by reference herein.

BACKGROUND

Field

Aspects of the present disclosure relate generally to wireless communication systems, and more particularly, to service continuity with evolved multimedia broadcast multicast service (MBMS) (eMBMS) support on a non-self-standing carrier.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

In an aspect, a method, a computer program product, and an apparatus for wireless communication are provided. The apparatus may be a UE. The UE receives information indicating an available MBMS service, a non-self-standing carrier frequency on which the available MBMS service is provided, and one or more primary component carrier (PCC) frequencies to which the non-self-standing carrier frequency is attached. The UE selects a preference for one PCC frequency of the one or more PCC frequencies in order to obtain information for receiving the available MBMS service on the non-self-standing carrier frequency. The UE receives the available MBMS service on the non-self-standing carrier frequency based on the obtained information.

In an aspect, a method, a computer program product, and an apparatus for wireless communication are provided. The apparatus may be a network entity. The network entity receives information indicating an available MBMS service, a non-self-standing carrier frequency on which the available MBMS service is provided, and one or more PCC frequencies to which the non-self-standing carrier frequency is attached. The network entity sends the information to a UE.

BRIEF DESCRIPTION OF THE DRAWINGS

FIG. 10 is a flow chart of a first method of wireless communication.

FIG. 11 is a flow chart of a second method of wireless communication.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
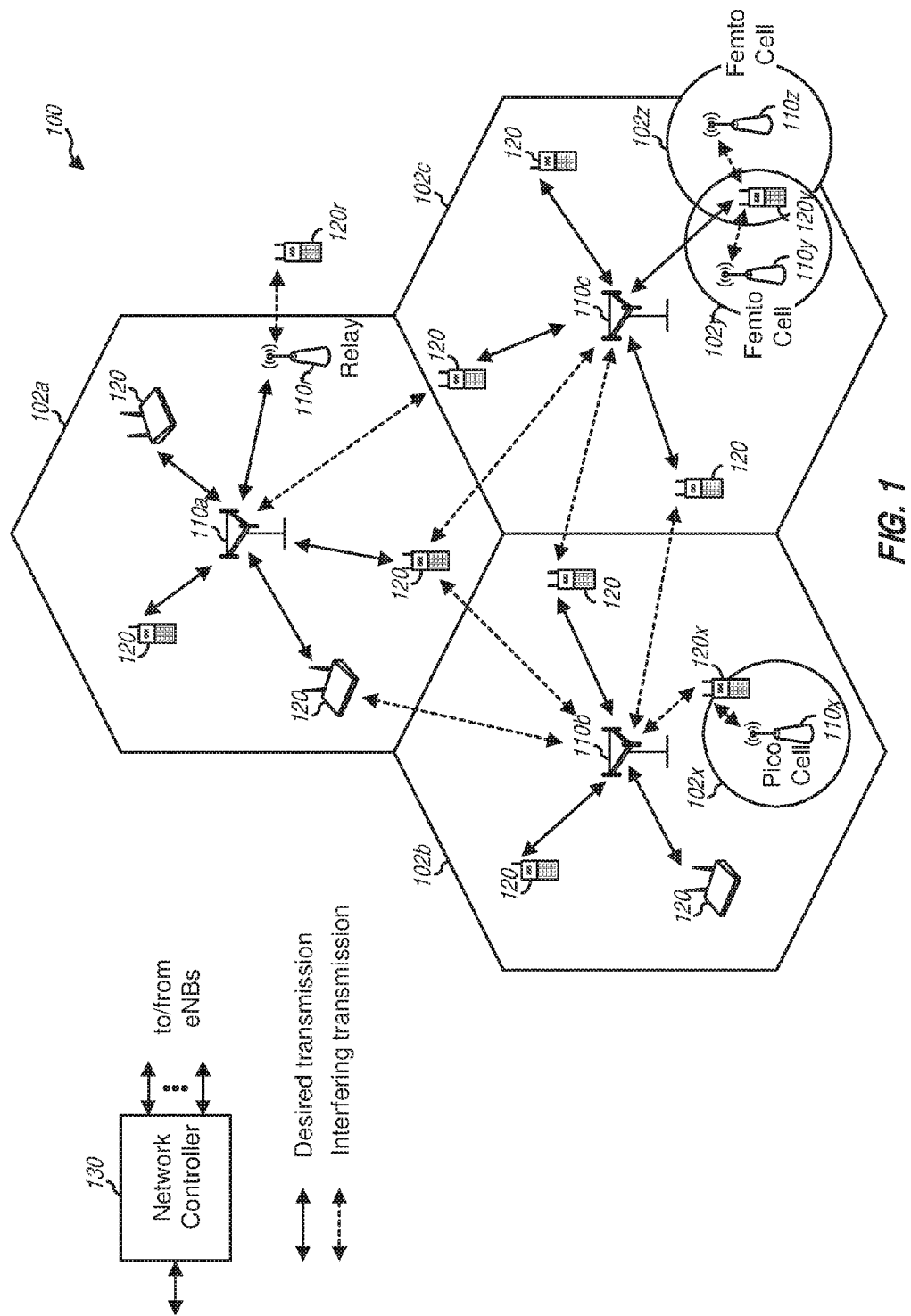
FIG. 1 is a block diagram conceptually illustrating an example of a telecommunications system.

FIG. 1 shows a wireless communication network 100, which may be an LTE network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
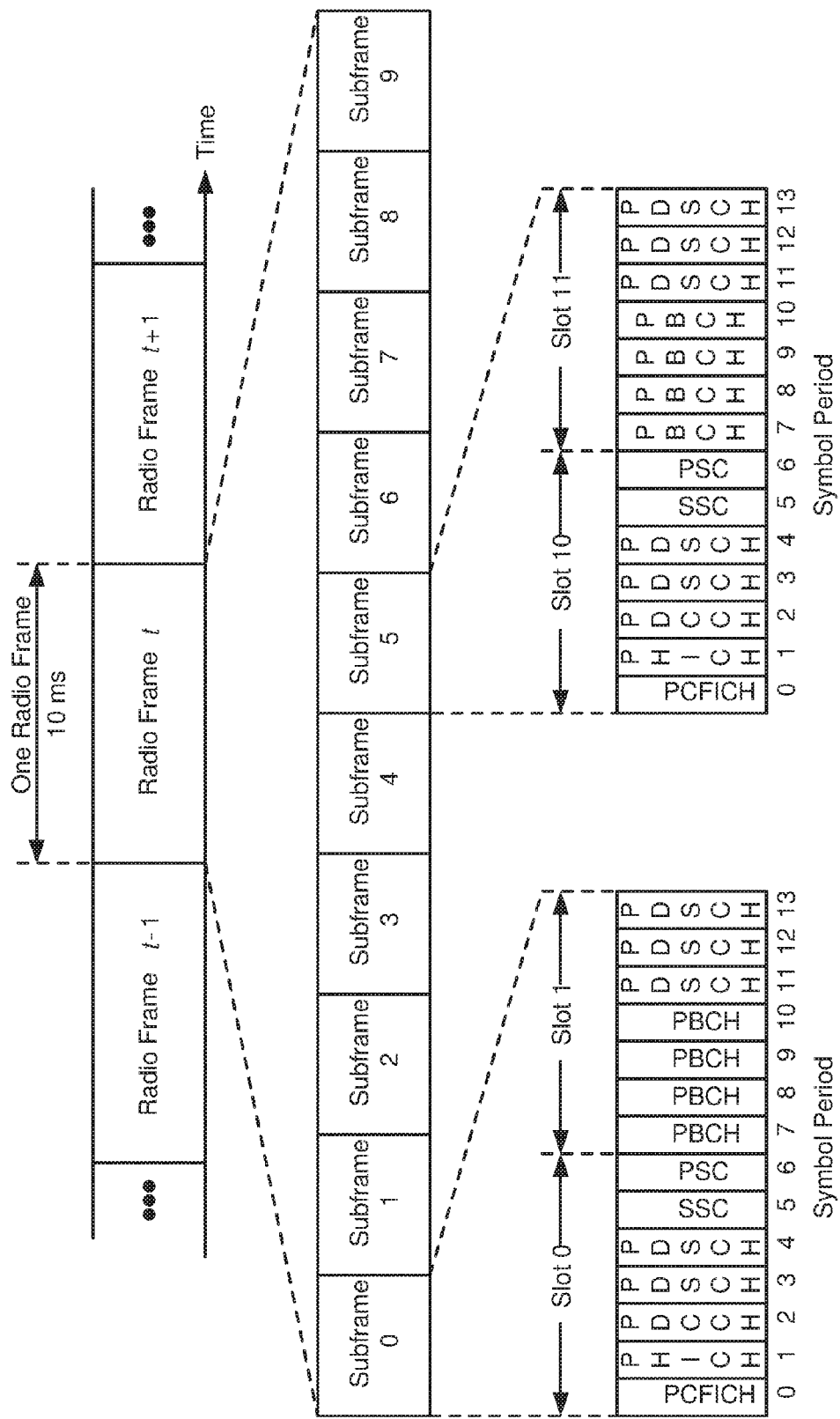
FIG. 2 is a block diagram conceptually illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
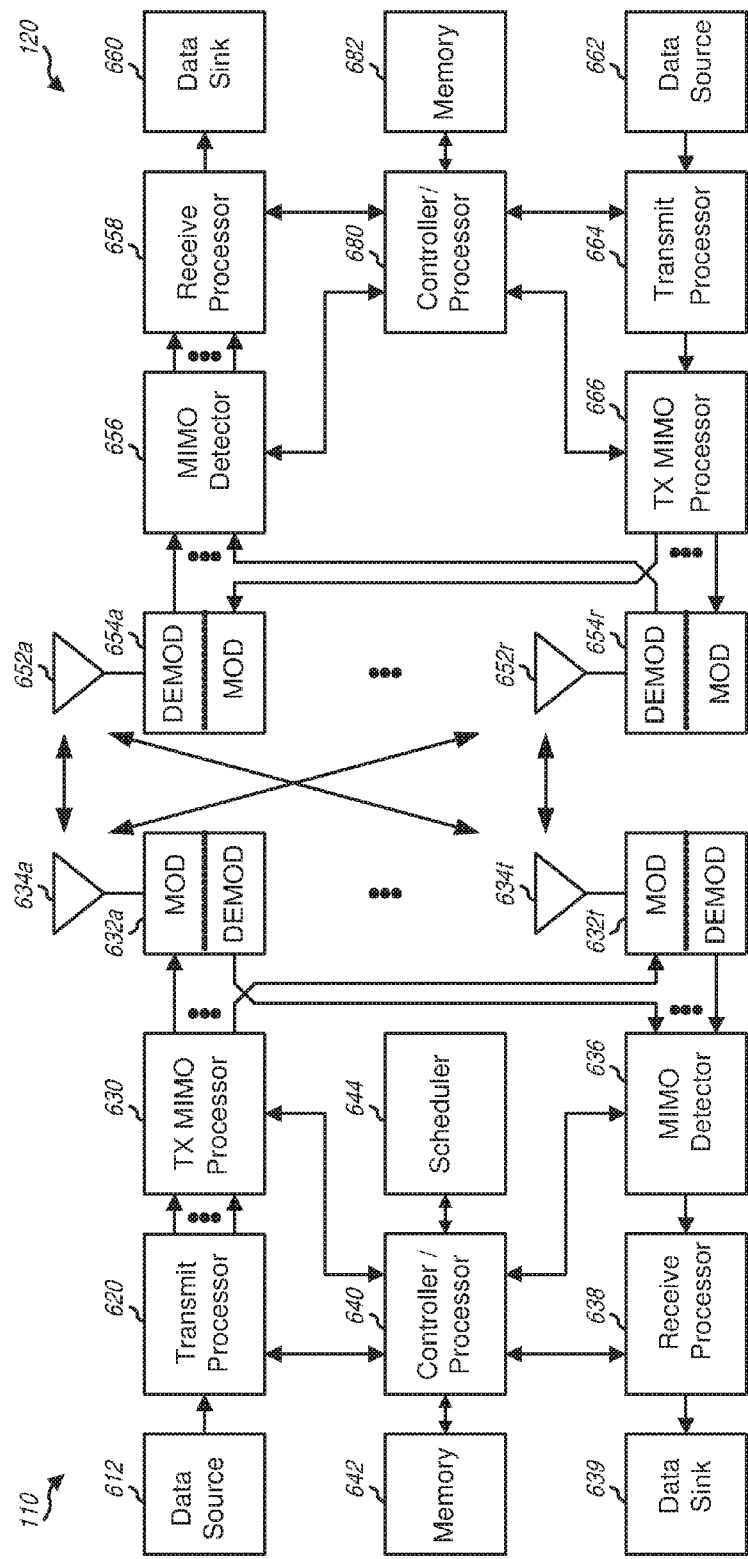
FIG. 3 is a block diagram conceptually illustrating is a block diagram conceptually illustrating a design of a base station/eNodeB and a UE configured according to one aspect of the present disclosure.

FIG. 3 shows a block diagram of a design of a base station/eNodeB 110 and a UE 120, which may be one of the base stations/eNodeBs and one of the UEs in FIG. 1. For a restricted association scenario, the base station 110 may be the macro eNodeB 110c in FIG. 1, and the UE 120 may be the UE 120y. The base station 110 may also be a base station of some other type. The base station 110 may be equipped with antennas 634a through 634t, and the UE 120 may be equipped with antennas 652a through 652r.

At the base station 110, a transmit processor 620 may receive data from a data source 612 and control information from a controller/processor 640. The control information may be for the PBCH, PCFICH, PHICH, PDCCH, etc. The data may be for the PDSCH, etc. The processor 620 may process (e.g., encode and symbol map) the data and control information to obtain data symbols and control symbols, respectively. The processor 620 may also generate reference symbols, e.g., for the PSS, SSS, and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 120, the antennas 652a through 652r may receive the downlink signals from the base station 110 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 120 to a data sink 660, and provide decoded control information to a controller/processor 680.

On the uplink, at the UE 120, a transmit processor 664 may receive and process data (e.g., for the PUSCH) from a data source 662 and control information (e.g., for the PUCCH) from the controller/processor 680. The processor 664 may also generate reference symbols for a reference signal. The symbols from the transmit processor 664 may be precoded by a TX MIMO processor 666 if applicable, further processed by the modulators 654a through 654r (e.g., for SC-FDM, etc.), and transmitted to the base station 110. At the base station 110, the uplink signals from the UE 120 may be received by the antennas 634, processed by the demodulators 632, detected by a MIMO detector 636 if applicable, and further processed by a receive processor 638 to obtain decoded data and control information sent by the UE 120. The processor 638 may provide the decoded data to a data sink 639 and the decoded control information to the controller/processor 640.

The controllers/processors 640 and 680 may direct the operation at the base station 110 and the UE 120, respectively. The processor 640 and/or other processors and modules at the base station 110 may perform or direct the execution of various processes for the techniques described herein. The processor 680 and/or other processors and modules at the UE 120 may also perform or direct the execution of the functional blocks illustrated in FIGS. 4 and 5, and/or other processes for the techniques described herein. The memories 642 and 682 may store data and program codes for the base station 110 and the UE 120, respectively. A scheduler 644 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 680, the memory 682, the receive processor 658, the MIMO detector 656, the demodulators 654a, and the antennas 652a configured to perform the functions recited by the aforementioned means. In another aspect, the aforementioned means may be a module or any apparatus configured to perform the functions recited by the aforementioned means.

Carrier Aggregation

LTE-Advanced UEs use spectrum up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments will conserve spectrum and are a good fit for the typically asymmetric bandwidth utilization by broadband subscribers.

Carrier Aggregation Types

Figure 4A:
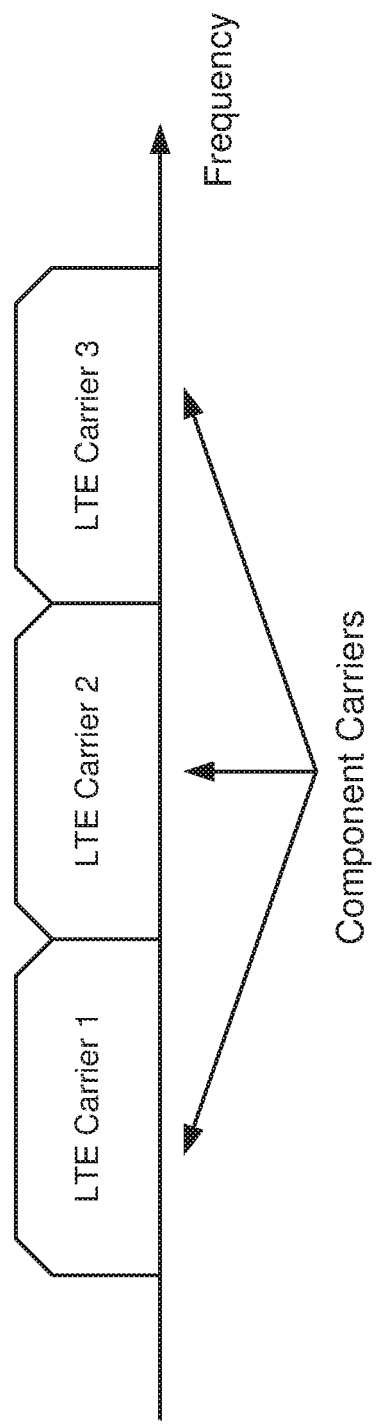
FIG. 4A discloses a continuous carrier aggregation type.
Figure 4B:
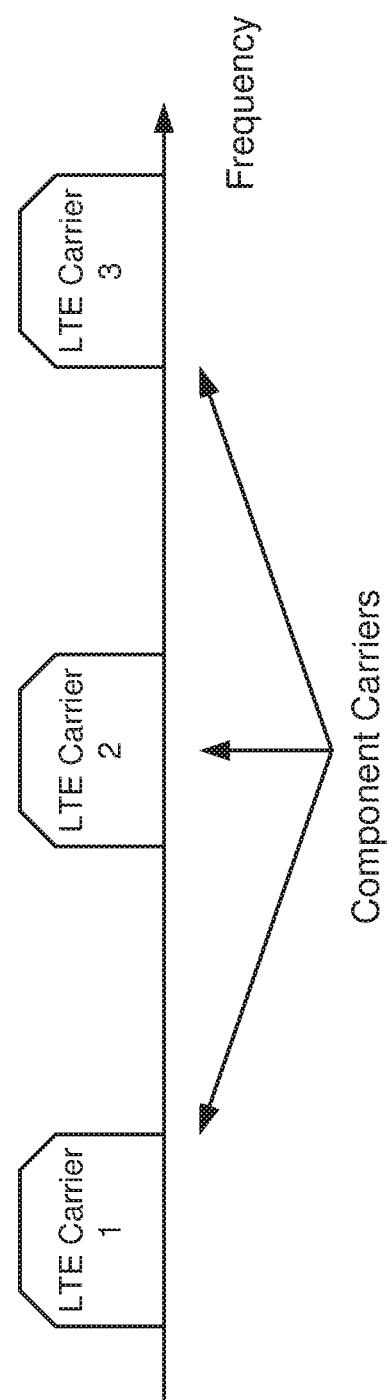
FIG. 4B discloses a non-continuous carrier aggregation type.

For the LTE-Advanced mobile systems, two types of carrier aggregation (CA) methods have been proposed, continuous CA and non-continuous CA. They are illustrated in FIGS. 4A and 4B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Data Aggregation Schemes

Figure 5:
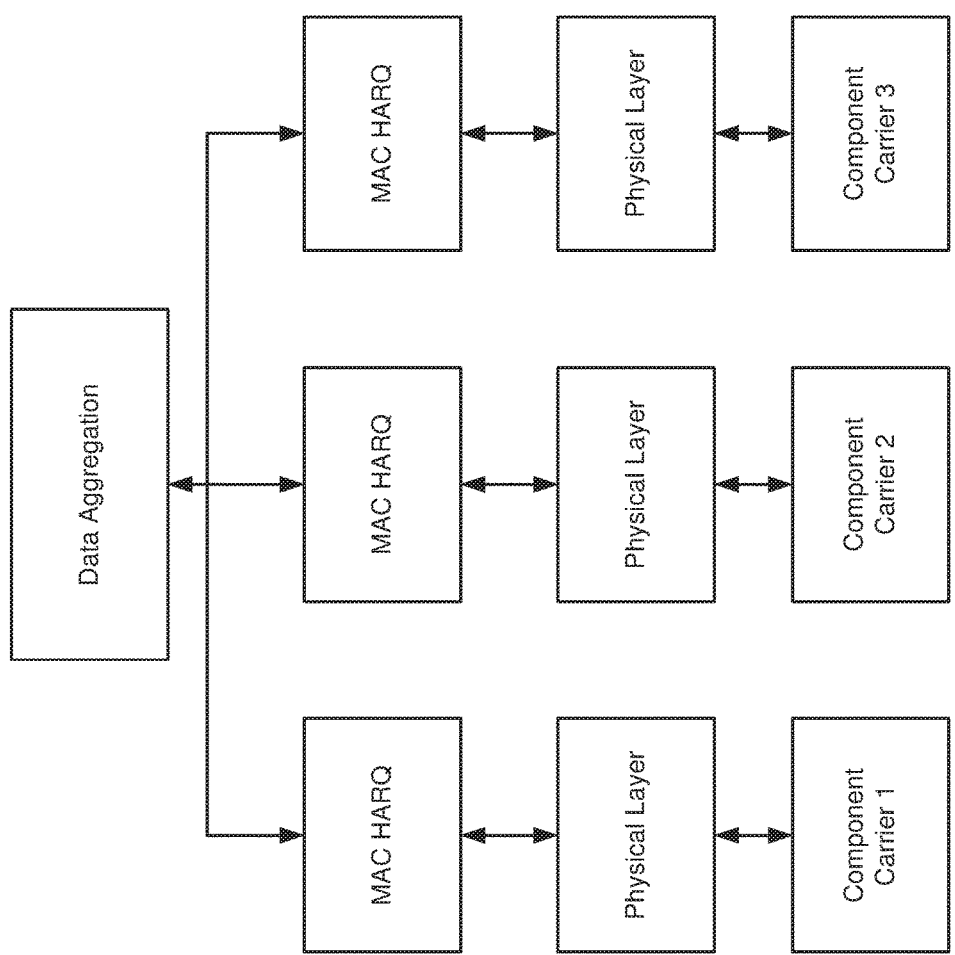
FIG. 5 discloses MAC layer data aggregation.

FIG. 5 illustrates aggregating transmission blocks (TBs) from different component carriers at the medium access control (MAC) layer (FIG. 5) for an International Mobile Telecommunication (IMT) Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for an IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNode B.

In some embodiments, there may be multiple primary carriers. In addition, secondary carriers may be added or removed without affecting the basic operation of the UE, including physical channel establishment and RLF procedures which are layer 2 procedures, such as described in the 3GPP technical specification 36.331 for the LTE RRC protocol.

Figure 6:
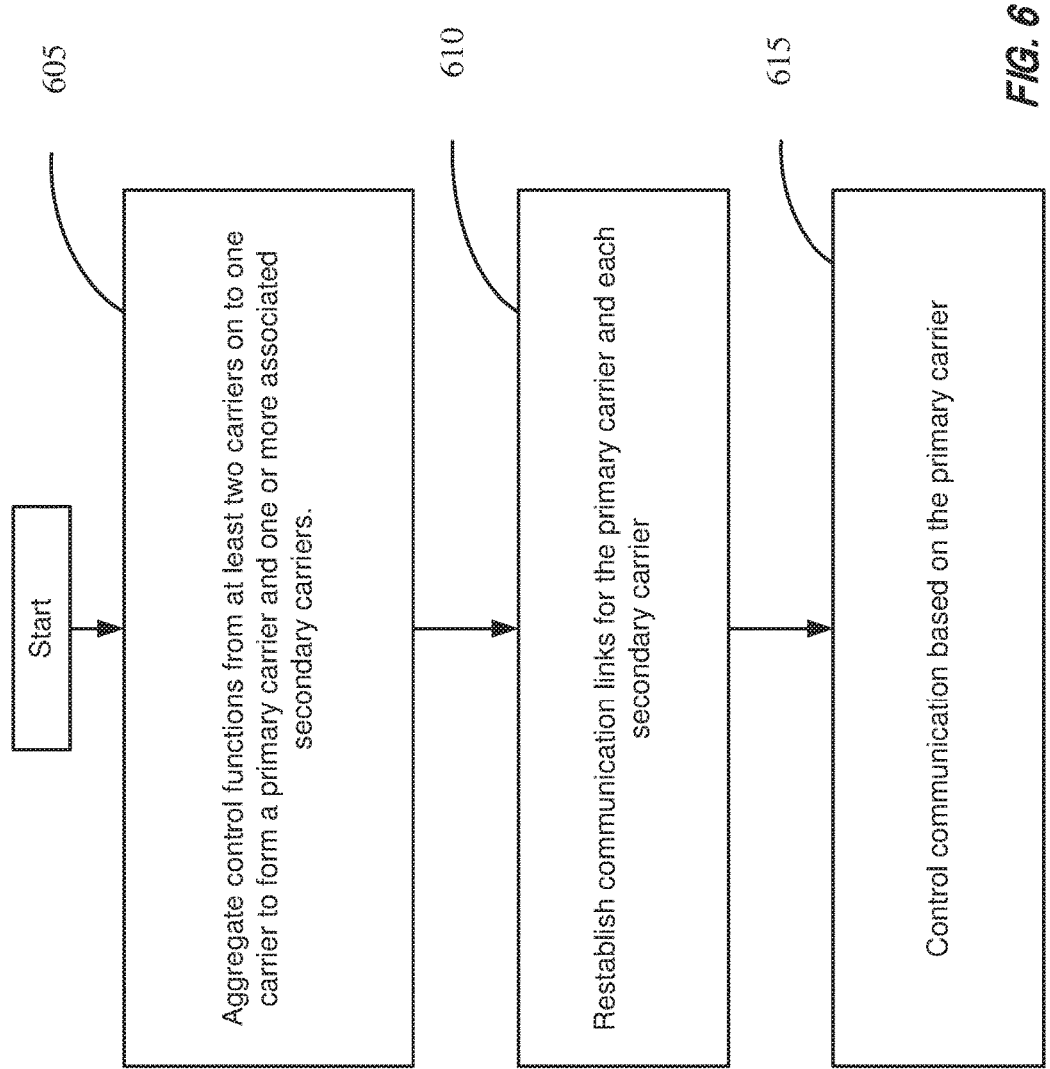
FIG. 6 is a block diagram illustrating a method for controlling radio links in multiple carrier configurations.

FIG. 6 illustrates a method 600 for controlling radio links in a multiple carrier wireless communication system by grouping physical channels according to one example. As shown, the method includes, at block 605, aggregating control functions from at least two carriers onto one carrier to form a primary carrier and one or more associated secondary carriers. Next at block, 610, communication links are established for the primary carrier and each secondary carrier. Then, communication is controlled based on the primary carrier in block 615.

Figure 7:
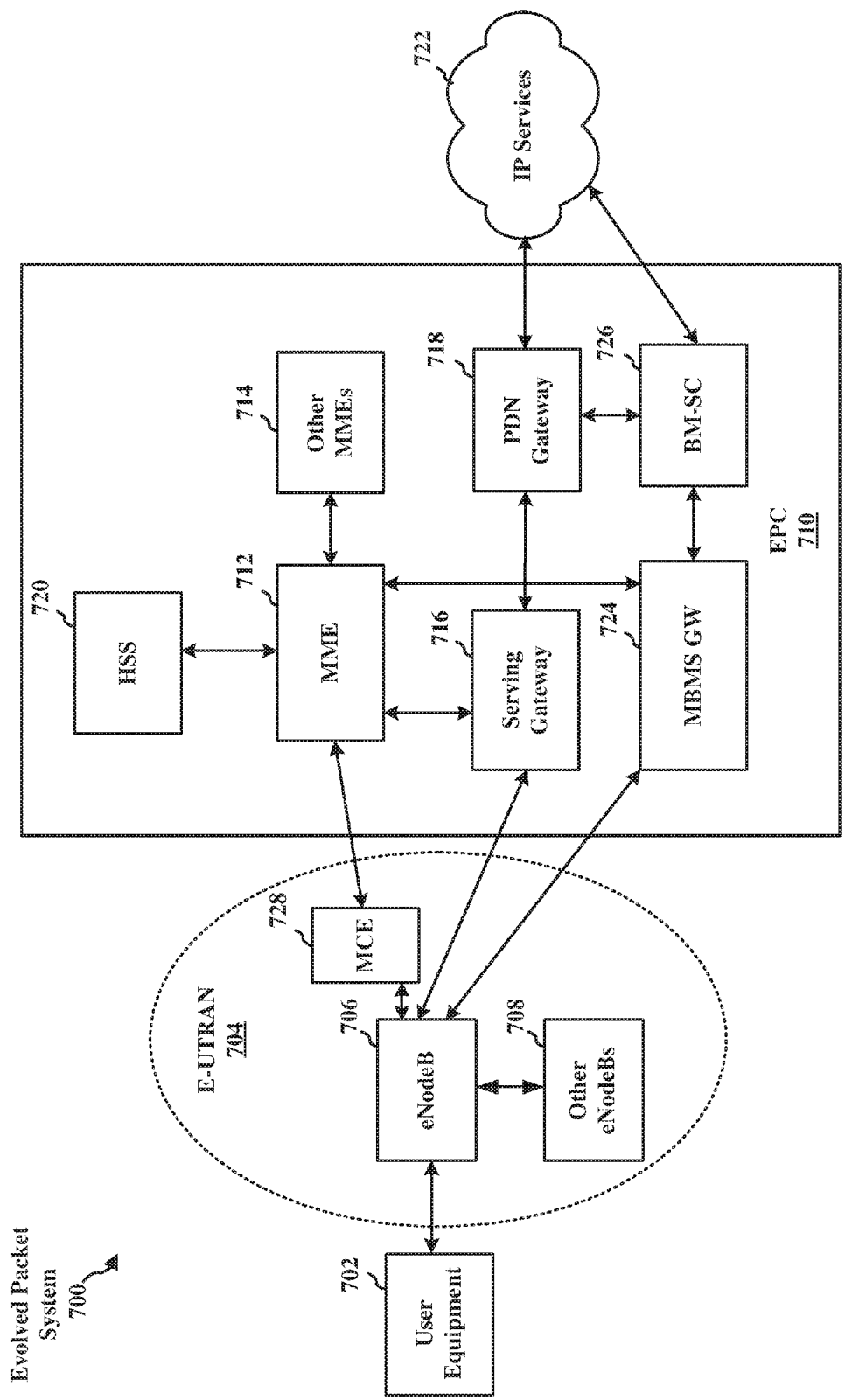
FIG. 7 is a diagram illustrating an example of a network architecture.

FIG. 7 is a diagram illustrating an LTE network architecture 700. The LTE network architecture 700 may be referred to as an Evolved Packet System (EPS) 700. The EPS 700 may include one or more user equipment (UE) 702, an Evolved UMTS Terrestrial Radio Access Network (E-UTRAN) 704, an Evolved Packet Core (EPC) 710, and an Operator's Internet Protocol (IP) Services 722. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 706 and other eNBs 708, and may include a Multicast Coordination Entity (MCE) 728. The eNB 706 provides user and control planes protocol terminations toward the UE 702. The eNB 706 may be connected to the other eNBs 708 via a backhaul (e.g., an X2 interface). The MCE 728 allocates time/frequency radio resources for eMBMS, and determines the radio configuration (e.g., a modulation and coding scheme (MCS)) for the eMBMS. The MCE 728 may be a separate entity or part of the eNB 706. The eNB 706 may also be referred to as a base station, a Node B, an access point, a base transceiver station, a radio base station, a radio transceiver, a transceiver function, a basic service set (BSS), an extended service set (ESS), or some other suitable terminology. The eNB 706 provides an access point to the EPC 710 for a UE 702. Examples of UEs 702 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 702 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 706 is connected to the EPC 710. The EPC 710 may include a Mobility Management Entity (MME) 712, a Home Subscriber Server (HSS) 720, other MMEs 714, a Serving Gateway 716, an MBMS Gateway 724, a Broadcast Multicast Service Center (BM-SC) 726, and a Packet Data Network (PDN) Gateway 718. The MME 712 is the control node that processes the signaling between the UE 702 and the EPC 710. Generally, the MME 712 provides bearer and connection management. All user IP packets are transferred through the Serving Gateway 716, which itself is connected to the PDN Gateway 718. The PDN Gateway 718 provides UE IP address allocation as well as other functions. The PDN Gateway 718 and the BM-SC 726 are connected to the IP Services 722. The IP Services 722 may include the Internet, an intranet, an IP Multimedia Subsystem (IMS), a PS Streaming Service (PSS), and/or other IP services. The BM-SC 726 may provide functions for MBMS user service provisioning and delivery. The BM-SC 726 may serve as an entry point for content provider MBMS transmission, may be used to authorize and initiate MBMS Bearer Services within a PLMN, and may be used to schedule and deliver MBMS transmissions. The MBMS Gateway 724 may be used to distribute MBMS traffic to the eNBs (e.g., 706, 708) belonging to a Multicast Broadcast Single Frequency Network (MBSFN) area broadcasting a particular service, and may be responsible for session management (start/stop) and for collecting eMBMS related charging information.

Figures 8A, 8B:
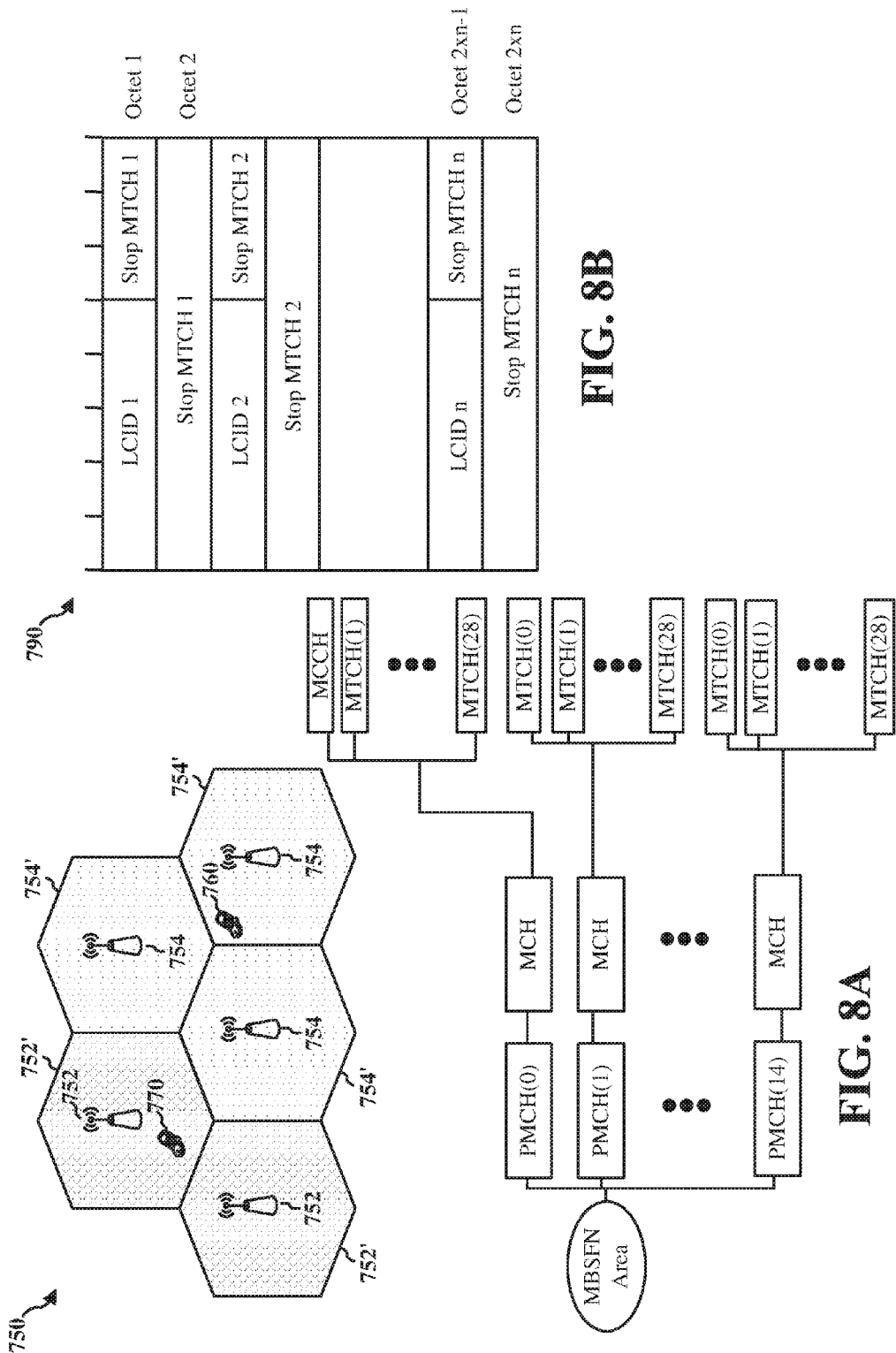
FIG. 8A is a diagram illustrating an example of an evolved Multimedia Broadcast Multicast Service channel configuration in a Multicast Broadcast Single Frequency Network.
FIG. 8B is a diagram illustrating a format of a Multicast Channel Scheduling Information Media Access Control control element.

FIG. 8A is a diagram 750 illustrating an example of an eMBMS channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 8A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE may acquire a system information block (SIB) 13 (SIB13). In a second step, based on the SIB13, the UE may acquire an MBSFN Area Configuration message on an MCCH. In a third step, based on the MBSFN Area Configuration message, the UE may acquire an MCH scheduling information (MSI) MAC control element. The SIB13 indicates (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There may be one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 8B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

A non-self-standing carrier is any carrier that cannot stand on its own, including carriers without synchronization/SIB/PBCH signaling or carriers that are DL only and do not have a paired UL carrier. A non-self-standing carrier may be a new carrier type (NCT) (no SIB/PBCH signaling), a dedicated MBSFN carrier (no synchronization/SIB/PBCH signaling), a DL only carrier, or a secondary component carrier (SCC) that is not a primary component carrier (PCC) for any UEs. A non-self-standing carrier is a carrier on which UEs cannot camp, either because no synchronization, SIB, and/or PBCH is transmitted on the carrier or because the carrier does not have an associated UL carrier. A non-self-standing carrier may provide enhanced spectral efficiency, improved support for heterogeneous networks, and energy efficiency. The non-self-standing carrier may be aggregated with a legacy LTE carrier. The legacy LTE carrier may be referred to as a base carrier or a PCC. For the non-self-standing carrier (e.g., NCT), common reference signals or cell-specific reference signals (CRS) may be transmitted in every $5^{th}$ subframe and sent from a single antenna port, only enhanced PDCCH (E-PDCCH) may be supported, PDSCH transmissions may be based on demodulation reference signals (DM-RS), no control channel common search space may be defined, and no system information block (SIB) or paging may be transmitted.

Service continuity, which was introduced in LTE Release 11, allows the UE to start or to continue receiving MBMS service(s) via MBSFN when changing cell(s). MBMS assistance information introduced from the network may include (1) a user service description (USD) (in the USD, for each service the application/service layer provides the TMGI, the session start and end time, the frequencies and the MBMS service area identities (SAIs) belonging to the MBMS service area); and (2) system information (MBMS and non-MBMS cells indicate in a SIB 15 (SIB15) (also referred to as a SystemInformationBlockType15) the MBMS SAIs of the current frequency and of each neighbor frequency).

A UE may determine a frequency that provides the related eMBMS services. If the serving cell provides a SIB15, a UE may consider that a frequency is providing an MBMS service via MBSFN when one of the MBMS SAI(s) of the frequency as indicated in the SIB15 of the serving cell is indicated for this MBMS service in the USD. If the serving cell does not provide a SIB15, a UE in an RRC idle state/mode (also referred to as an RRC_IDLE state/mode) may consider that a frequency included in the USD for the MBMS service is providing this MBMS service as long as the UE reselects cells where a SIB 13 (SIB13) (also referred to as a SystemInformationBlockType13) is provided.

Once a UE determines the frequency that provides MBMS services, the UE may prioritize the corresponding frequency for cell reselection when in an RRC idle state or indicate the frequency in an RRC message MBMSInterestIndication (also referred to as an MBMS interest indication message) when in an RRC connected state/mode (also referred to as an RRC_CONNECTED state/mode). However, the existing procedures on service continuity do not address the scenario when an eMBMS service is provided on a non-self-standing carrier, but not on a base carrier. More specifically, prioritizing an MBMS frequency layer does not allow a UE to camp on or to connect to a corresponding non-self-standing carrier with a service of interest to the UE, as the UE generally is not aware of the associated base carrier for the non-self-standing carrier and the base carrier provides all the necessary system and MBMS-notification information for a UE to receive eMBMS on a non-self-standing carrier. Accordingly, there is a current need for enabling service continuity with reception of eMBMS on a non-self-standing carrier.

In order for a UE to receive eMBMS on a non-self-standing carrier, the UE may need to be able to prioritize a frequency associated with the base carrier. Once a UE camps on the base carrier, the UE may acquire all the required information (e.g., system information and MCCH change notification messages) for eMBMS reception on the non-self-standing carrier. In one configuration, a USD may provide the session start and end time, the frequencies, the MBMS SAIs, and the TMGI for each service. The frequencies may include the base carrier frequency list and/or the non-self-standing carrier frequency or frequencies. In one configuration, the SIB15 on a base carrier provides the MBMS SAIs of the current frequency and of each neighbor frequency. If a frequency belongs to a non-self-standing carrier frequency in the MBMS service area, the associated base carrier frequency may be further provided. A UE may prioritize a base carrier frequency if the SAI of the non-self-standing carrier frequency as indicated in the SIB15 is indicated in the USD. The association between base carrier and non-self-standing carrier may be sent in a SIB15 or may be sent in some other SIB.

There are certain deployment scenarios where an eNB may not broadcast a SIB15 and the UE may only rely on a USD for service continuity. Therefore, to provision for a scenario where a cell may not support service continuity, (1) the associated base carrier frequency may be further provided in the USD if a frequency belongs to a non-selfstanding carrier frequency in the MBMS service area, and (2) frequency information of the base carrier and the non-self-standing carrier may be made available to a BM-SC via an operations, administration, and maintenance (OAM) entity.

Frequency prioritization may be useful for a UE in an RRC idle state to perform cell reselection. For UEs in an RRC connected state, a UE may indicate a frequency of interest in an MBMS interest indication message. If a UE is interested in an MBMS service on a frequency provided on a non-self-standing carrier, the UE may indicate either the non-self-standing carrier frequency or the base carrier frequency in an MBMS interest indication message. With the knowledge of neighbor frequency association between the base carrier and the non-self-standing carrier at the eNB, a source cell may hand over the UE to a corresponding target cell accordingly if needed. In one configuration, a UE indicates a base carrier frequency if the UE is interested in service offered on an associated non-self-standing carrier. Because a UE may change its interest on different non-self-standing carriers associated with the same base carrier, signaling a non-self-standing carrier frequency may result in frequent reporting of MBMS interest indication from the UE, thereby increasing system overhead.

One non-self-standing carrier may be attached to multiple base carriers. A SIB15 or other SIB may indicate the base carrier frequency list associated with the same non-self-standing carrier, where the base carrier frequency list includes multiple frequencies with each frequency associated with each base carrier. Optionally, a USD may provide a base carrier frequency list associated with the same non-self-standing carrier. A UE may prioritize the base carrier or indicate the base carrier frequency with the best unicast measurement.

Design aspects with respect to service continuity when eMBMS is supported on a non-self-standing carrier frequency are provided supra. A USD may provide the session start and end time, the frequencies, the MBMS SAIs, and the TMGI for each service. The frequencies may include the base carrier frequency and/or the non-self-standing carrier frequency. A SIB15 may provide the MBMS SAIs of the current frequency and of each neighbor frequency. If a frequency belongs to a non-self-standing carrier in the MBMS service area, the associated base carrier frequency list may be further provided. Such association may be added in a SIB15 or may be sent in another SIB. A UE may prioritize a base carrier frequency if an SAI of a non-self-standing carrier frequency as indicated in a SIB15 is indicated in a USD. If more than one base carrier frequency is included in the associated list, a UE may prioritize the base carrier with the best unicast measurement (e.g., the highest RSRP and/or RSRQ). Alternatively, if more than one base carrier frequency is included in the associated list, a UE may prioritize all the base carrier frequencies in the associated list with equal priority. A UE in an RRC idle state may follow equal priority cell reselection criteria based on unicast measurements as defined in 3GPP TS 36.304. A UE in an RRC connected state may indicate the frequency among the associated list with best unicast measurements as the preferred frequency. Unicast measurements typically consist of RSRP and/or RSRQ as defined in 3GPP TS 36.214. To provision for a scenario where a cell may not support service continuity, (1) the associated base carrier frequency list may be further provided in a USD if a frequency belongs to a non-self-standing carrier in the MBMS service area (if more than one base carrier frequency is included in the associated list, a UE may prioritize the base carrier with the best unicast measurement); and (2) frequency information of the base carrier and the non-self-standing carrier may be made available to a BM-SC via an OAM entity. UEs in an RRC connected state may signal the associated base carrier frequency instead of the non-self-standing carrier frequency when a service of interest is offered on a non-self-standing carrier. If more than one base carrier frequency is included in the associated list for the same non-self-standing carrier, a UE may indicate the base carrier frequency among the associated list with the best unicast measurement.

Figure 9:
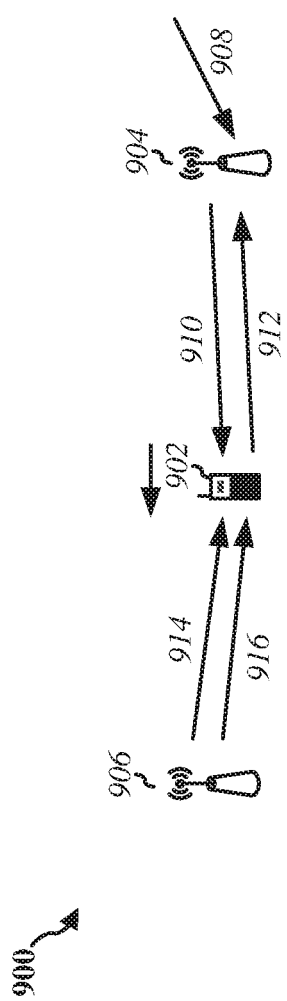
FIG. 9 is a diagram for illustrating exemplary methods.

FIG. 9 is a diagram 900 for illustrating exemplary methods. As shown in FIG. 9, a network entity (e.g., eNB) 904 receives information 908 indicating an available MBMS service, a non-self-standing carrier (e.g., a NCT, dedicated MBSFN carrier, a DL only carrier without a paired UL carrier, or an SCC that is not a PCC for another UE) frequency 916 on which the available MBMS service is provided, and one or more PCC frequencies (which includes the one PCC frequency 914) to which the non-self-standing carrier frequency 916 is attached. The network entity sends the information 910 to a UE 902. There are at least four possible scenarios regarding the relationship between the PCC and the non-self-standing carrier frequency: (1) when the UE is in an RRC connected state, the non-self-standing carrier frequency may be assigned to the UE as a SCC of the PCC; (2) when the UE is in an RRC connected state, the non-self-standing carrier frequency may not be assigned to the UE as an SCC and the UE may select a cell of the non-self-standing carrier frequency per system information broadcast on the PCC; (3) when the UE is in an RRC idle state, the UE may receive the PCC and the non-self-standing carrier frequency simultaneously; and (4) when the UE is in an RRC idle state, the non-self-standing carrier frequency and the PCC may share a receiver in time division multiplex (TDM) (e.g., the non-self-standing carrier and the PCC are time division multiplexed and the UE will have to tune away from one carrier to receive the other carrier).

In one configuration, the network entity 904 may receive a preference 912 for one PCC frequency 914 of the one or more PCC frequencies from the UE 902. The one PCC frequency 914 and the non-self-standing carrier frequency 916 are associated with the network entity (e.g., eNB) 906. The network entity 904 may hand off the UE 902 to the one PCC frequency 914 preferred by the UE 902 (i.e., the UE is handed off to a cell at the preferred frequency). In one configuration, the network entity 904 may receive a preference for the non-self-standing carrier frequency 916 from the UE 902. The network entity 904 may hand off the UE 902 to the PCC frequency 914 attached to the non-self-standing carrier frequency 916. The PCC frequency 914 may be one of the one or more PCC frequencies. The non-self-standing carrier frequency 916 may be an NCT, a dedicated MBSFN carrier frequency, a DL only carrier frequency, or an SCC frequency that is not a PCC frequency for another UE.

The UE 902 may receive information 910 indicating an available MBMS service, a non-self-standing carrier frequency 916 on which the available MBMS service is provided, and one or more PCC frequencies to which the non-self-standing carrier frequency 916 is attached. The UE 902 selects a preference for one PCC frequency 914 of the one or more PCC frequencies in order to obtain information for receiving the available MBMS service on the non-self-standing carrier frequency 916. The UE 902 receives the available MBMS service on the non-self-standing carrier frequency 916 based on the obtained information 910. The non-self-standing carrier frequency 916 may be an NCT, a dedicated MBSFN carrier frequency, a DL only carrier frequency, or an SCC frequency that is not a PCC frequency for another UE. The information 910 may be received in at least one of a USD (which originates from a BM-SC) or a SIB. The SIB may be a SIB15 or other SIB.

The UE 902 may receive a USD. The USD may indicate the one or more PCC frequencies to which the non-self-standing carrier frequency 916 is attached. The UE 902 may receive a SIB. The SIB may indicate the one or more PCC frequencies to which the non-self-standing carrier frequency is attached. The UE 902 may receive a SIB. The SIB may indicate a plurality of frequencies and one or more PCC frequencies for each of the plurality of frequencies that are non-self-standing carrier frequencies. The UE 902 may receive a USD and a SIB. The USD may indicate a first SAI associated with the available MBMS service, and the SIB may indicate a second SAI associated with the non-self-standing carrier frequency 916 and the one or more PCC frequencies to which the non-self-standing carrier frequency 916 is attached. The UE 902 may select the preference for the one PCC frequency 914 when the first SAI and the second SAI are the same.

The UE 902 may select the preference for the one PCC frequency 914 based on unicast measurements when the one or more PCC frequencies is greater than one. The UE 902 may select the preference for the one PCC frequency 914 by prioritizing the one or more PCC frequencies with equal priority. The UE 902 may follow equal priority cell reselection criteria based on unicast measurements as defined in 3GPP TS 36.304 and determine that the one PCC frequency 914 is preferred when the UE 902 is in an RRC idle state. The UE 902 may select the preference for the one PCC frequency 914 by sending an MBMS interest indication message indicating the one PCC frequency 914 or the non-self-standing carrier frequency 916 when the UE 902 is in an RRC connected state. The MBMS interest indication message may indicate the one PCC frequency 914 when the UE 902 is in an RRC connected state.

The service continuity and service discovery concepts described above can also be extended to service continuity and service discovery across MBSFN areas for the neighbor cells. In this case, the serving eNB indicates available Service Area IDs associated with a non-self-standing carrier frequency on which the available MBMS service is provided, and one or more cell identities to which the non-self-standing carrier frequency is attached. The UE may select the neighbor cell to which the non-self-standing carrier frequency is attached to receive an MBMS service of interest when the UE is in an RRC idle state. In an RRC connected state, the UE may report the preferred cell identities to which the non-self-standing carrier frequency is attached to receive MBMS services of interest.

FIG. 10 is a flow chart of a first method of wireless communication. The method may be performed by a UE. In step 1002, the UE receives information indicating an available MBMS service, a non-self-standing carrier frequency on which the available MBMS service is provided, and one or more PCC frequencies to which the non-self-standing carrier frequency is attached. The non-self-standing carrier frequency may be an NCT, a dedicated MBSFN carrier frequency, a DL only carrier frequency, or an SCC frequency that is not a PCC frequency for another UE. In step 1002, the information may be received in a USD or a SIB. In one example, the information is received in a SIB15. In one example, in step 1002, the UE receives a USD and the USD indicates the one or more PCC frequencies to which the non-self-standing carrier frequency is attached. In another example, in step 1002, the UE receives a SIB and the SIB indicates the one or more PCC frequencies to which the non-self-standing carrier frequency is attached. In another example, in step 1002, the UE receives a SIB and the SIB indicates a plurality of frequencies and one or more PCC frequencies for each of the plurality of frequencies that are non-self-standing carrier frequencies. In yet another example, in step 1002, the UE receives a USD and a SIB. The USD may indicate a first SAI associated with the available MBMS service, and the SIB may indicate a second SAI associated with the non-self-standing carrier frequency and the one or more PCC frequencies to which the non-self-standing carrier frequency is attached. The UE may select a preference for the one PCC frequency when the first SAI and the second SAI are the same. In step 1004, the UE selects a preference for one PCC frequency of the one or more PCC frequencies in order to obtain information for receiving the available MBMS service on the non-self-standing carrier frequency. In one example, in step 1004, the UE may select the preference for the one PCC frequency based on unicast measurements when the one or more PCC frequencies is greater than one. In one example, in step 1004, when the UE is in an RRC idle state, the UE may select the preference for the one PCC frequency by prioritizing the one PCC frequency. In one example, in step 1004, when the UE is in an RRC connected state, the UE may select the preference for the one PCC frequency by sending an MBMS interest indication message indicating the one PCC frequency or the non-self-standing carrier frequency. When the UE is in an RRC connected state, the MBMS interest indication message may indicate the one PCC frequency. In step 1006, the UE receives the available MBMS service on the non-self-standing carrier frequency based on the obtained information.

FIG. 11 is a flow chart of a second method of wireless communication. The method may be performed by a network entity, such as an eNB. In step 1102, the network entity receives information indicating an available MBMS service, a non-self-standing carrier frequency on which the available MBMS service is provided, and one or more PCC frequencies to which the non-self-standing carrier frequency is attached. The non-self-standing carrier frequency may be an NCT, a dedicated MBSFN carrier frequency, a DL only carrier frequency, or an SCC frequency that is not a PCC frequency for another UE. In step 1104, the network entity sends the information to a UE. In step 1106, the network entity receives a preference for one PCC frequency of the one or more PCC frequencies from the UE or a preference for the non-self-standing carrier frequency from the UE. In step 1108, the network entity hands off the UE to the one PCC frequency preferred by the UE or to a PCC frequency attached to the non-self-standing carrier frequency. The PCC frequency is one of the one or more PCC frequencies.

Figure 12:
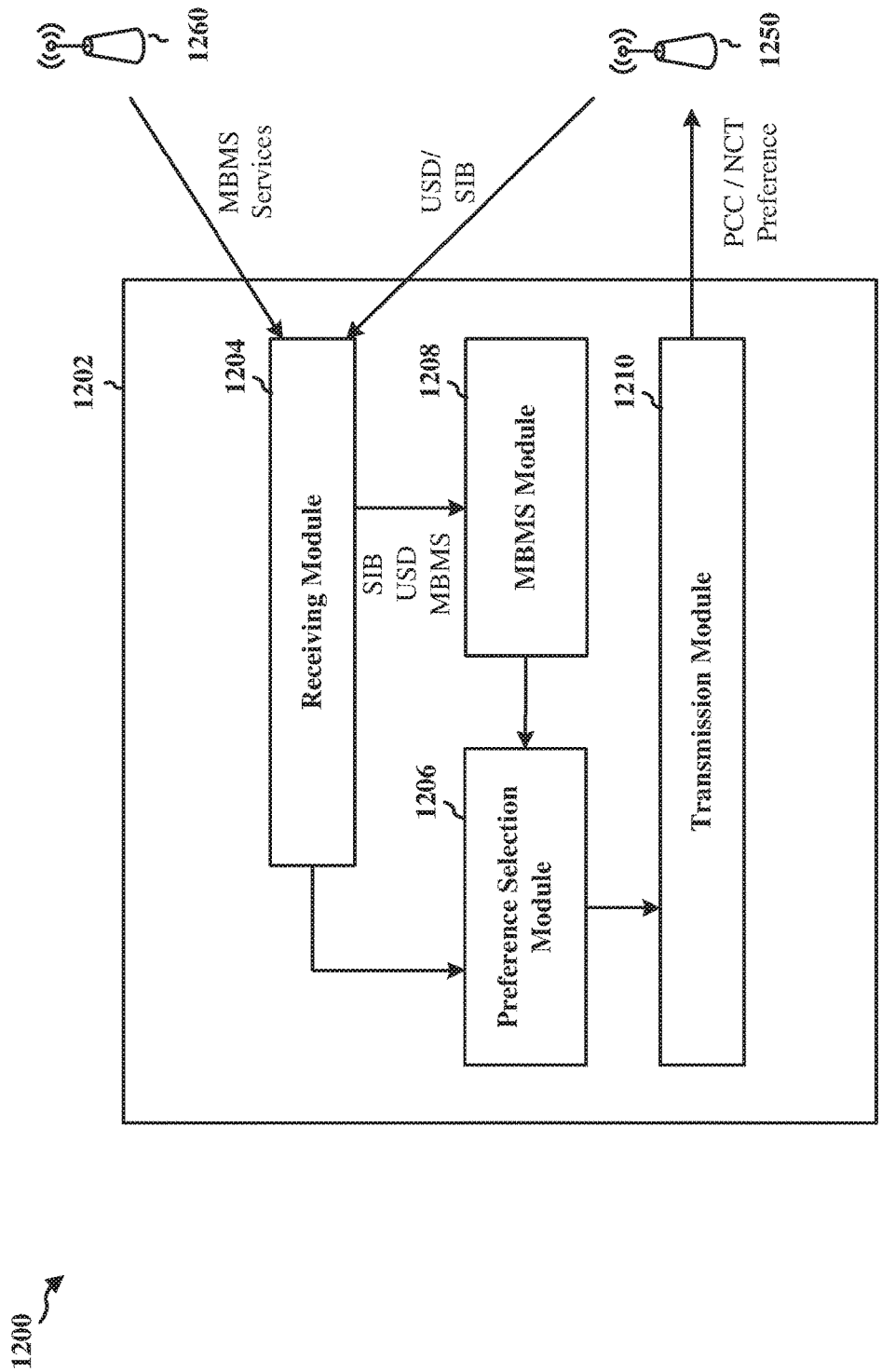
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE. The apparatus includes a receiving module 1204 that is configured to receive information indicating an available MBMS service, a non-self-standing carrier frequency on which the available MBMS service is provided, and one or more PCC frequencies to which the non-self-standing carrier frequency is attached. The receiving module 1204 may be configured to provide the received information to an MBMS module 1208. The receiving module 1204 may receive the information from a first cell 1250. The apparatus further includes a preference selection module 1206 that is configured to select a preference for one PCC frequency of the one or more PCC frequencies in order to obtain information for receiving the available MBMS service on the non-self-standing carrier frequency. The receiving module 1204 is further configured to receive the available MBMS service on the non-self-standing carrier frequency based on the obtained information. The receiving module 1204 may be configured to provide the available MBMS service to the MBMS module 1208. The receiving module 1204 may receive the available MBMS service from a second cell 1260. The first and second cells 1250, 1260 may be associated with the same eNB or may be associated with different eNBs.

The non-self-standing carrier frequency may be an NCT, a dedicated MBSFN carrier frequency, a DL only carrier frequency, or an SCC frequency that is not a PCC frequency for another UE. The information may be received in a USD or a SIB. The receiving module 1204 may provide the USD/SIB to the MBMS module 1208. The SIB through which the information is received may be a SIB15. The receiving module 1204 may be configured to receive the USD in which the USD indicates the one or more PCC frequencies to which the non-self-standing carrier frequency is attached. The receiving module 1204 may be configured to receive the SIB in which the SIB indicates the one or more PCC frequencies to which the non-self-standing carrier frequency is attached. The receiving module 1204 may be configured to receive the SIB in which the SIB indicates a plurality of frequencies and one or more PCC frequencies for each of the plurality of frequencies that are non-self-standing carrier frequencies. The receiving module 1204 may be configured to receive the USD and the SIB. In such a configuration, the USD indicates a first SAI associated with the available MBMS service, and the SIB indicates a second SAI associated with the non-self-standing carrier frequency and the one or more PCC frequencies to which the non-self-standing carrier frequency is attached. Further, the preference selection module 1206 is configured to select the preference for the one PCC frequency when the first SAI and the second SAI are the same. The preference selection module 1206 may be configured to select the preference for the one PCC frequency based on unicast measurements when the one or more PCC frequencies is greater than one. The preference selection module 1206 may be configured to select the preference for the one PCC frequency by prioritizing the one PCC frequency when the UE is in an RRC idle state. The preference selection module 1206 may be configured to select the preference for the one PCC frequency by sending an MBMS interest indication message indicating the one PCC frequency or the non-self-standing carrier frequency when the UE is in an RRC connected state. The MBMS interest indication message may indicate the one PCC frequency when the UE is in an RRC connected state.

The apparatus may include additional modules that perform each of the steps of the algorithm in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
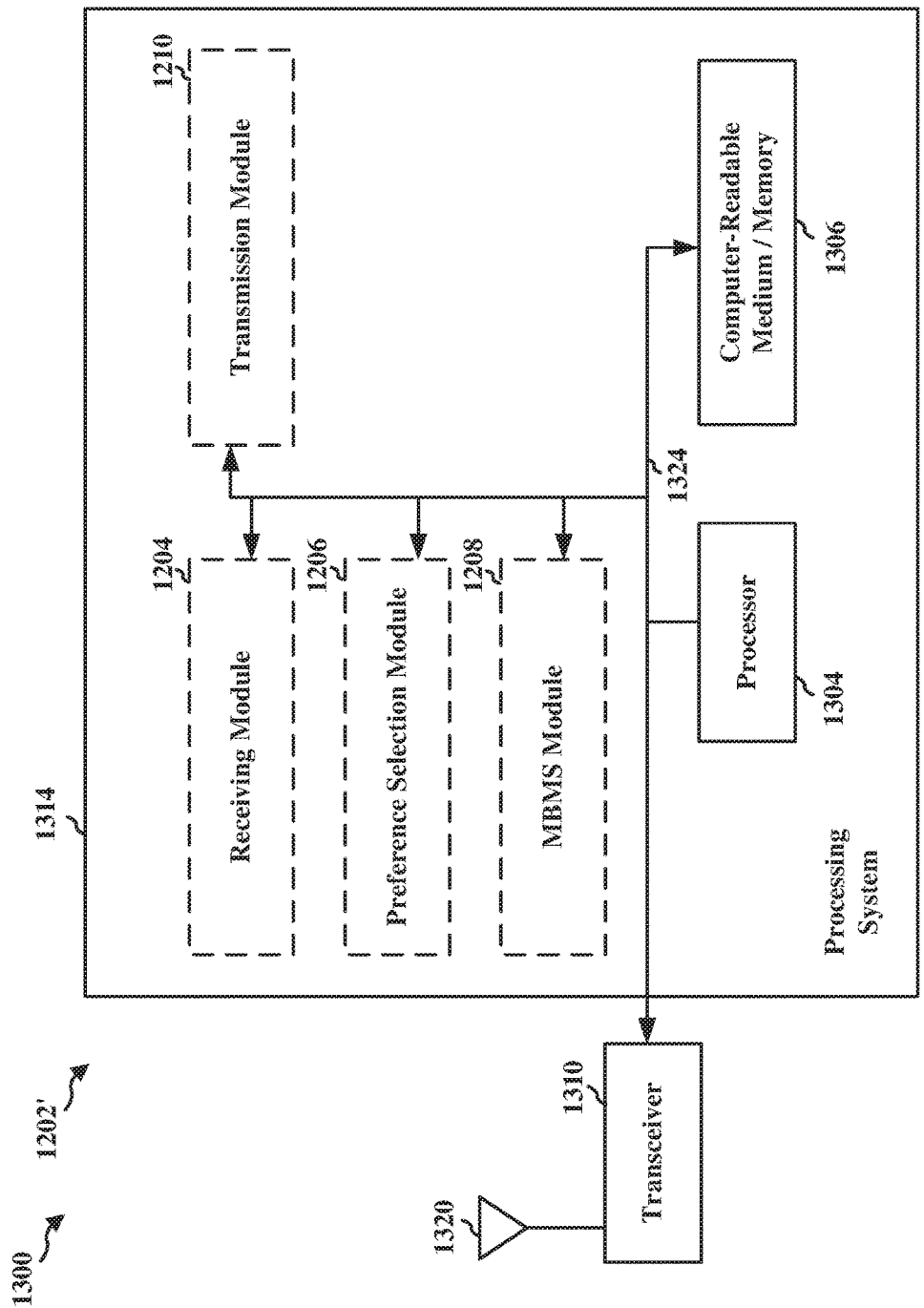
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, and 1210 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314. In addition, the transceiver 1310 receives information from the processing system 1314, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, 1208, and 1210. The modules may be software modules running in the processor 1304, resident/stored in the computer readable medium/memory 1306, one or more hardware modules coupled to the processor 1304, or some combination thereof. The processing system 1314 may be a component of the UE 120 and may include the memory 682 and/or at least one of the TX processor 664, the RX processor 658, and the controller/processor 680.

In one configuration, the apparatus 1202/1202' for wireless communication includes means for receiving information indicating an available MBMS service, a non-self-standing carrier frequency on which the available MBMS service is provided, and one or more PCC frequencies to which the non-self-standing carrier frequency is attached. The apparatus further includes means for selecting a preference for one PCC frequency of the one or more PCC frequencies in order to obtain information for receiving the available MBMS service on the non-self-standing carrier frequency. The apparatus further includes means for receiving the available MBMS service on the non-self-standing carrier frequency based on the obtained information.

The non-self-standing carrier frequency may be an NCT, a dedicated MBSFN carrier frequency, a DL only carrier frequency, or an SCC frequency that is not a PCC frequency for another UE. The information may be received in at least one of a USD or a SIB. The SIB may be a SIB15. In one configuration, the apparatus further includes means for receiving the USD, and the USD indicates the one or more PCC frequencies to which the non-self-standing carrier frequency is attached. In one configuration, the apparatus further includes means for receiving the SIB, and the SIB indicates the one or more PCC frequencies to which the non-self-standing carrier frequency is attached. In one configuration, the apparatus further includes means for receiving the SIB, and the SIB indicates a plurality of frequencies and one or more PCC frequencies for each of the plurality of frequencies that are non-self-standing carrier frequencies. In one configuration, the apparatus further includes means for receiving the USD and the SIB. In such a configuration, the USD indicates a first SAI associated with the available MBMS service, the SIB indicates a second SAI associated with the non-self-standing carrier frequency and the one or more PCC frequencies to which the non-self-standing carrier frequency is attached, and the preference for the one PCC frequency is selected when the first SAI and the second SAI are the same. In one configuration, the means for selecting the preference for the one PCC frequency is configured to select the preference for the one PCC frequency based on unicast measurements when the one or more PCC frequencies is greater than one. In one configuration, the means for selecting the preference for the one PCC frequency is configured to prioritize the one PCC frequency when the UE is in an RRC idle state. In one configuration, the means for selecting the preference for the one PCC frequency is configured to send an MBMS interest indication message indicating the one PCC frequency or the non-self-standing carrier frequency when the UE is in an RRC connected state. The MBMS interest indication message may indicate the one PCC frequency when the UE is in an RRC connected state.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 664, the RX Processor 658, and the controller/processor 680. As such, in one configuration, the aforementioned means may be the TX Processor 664, the RX Processor 658, and the controller/processor 680 configured to perform the functions recited by the aforementioned means.

Figure 14:
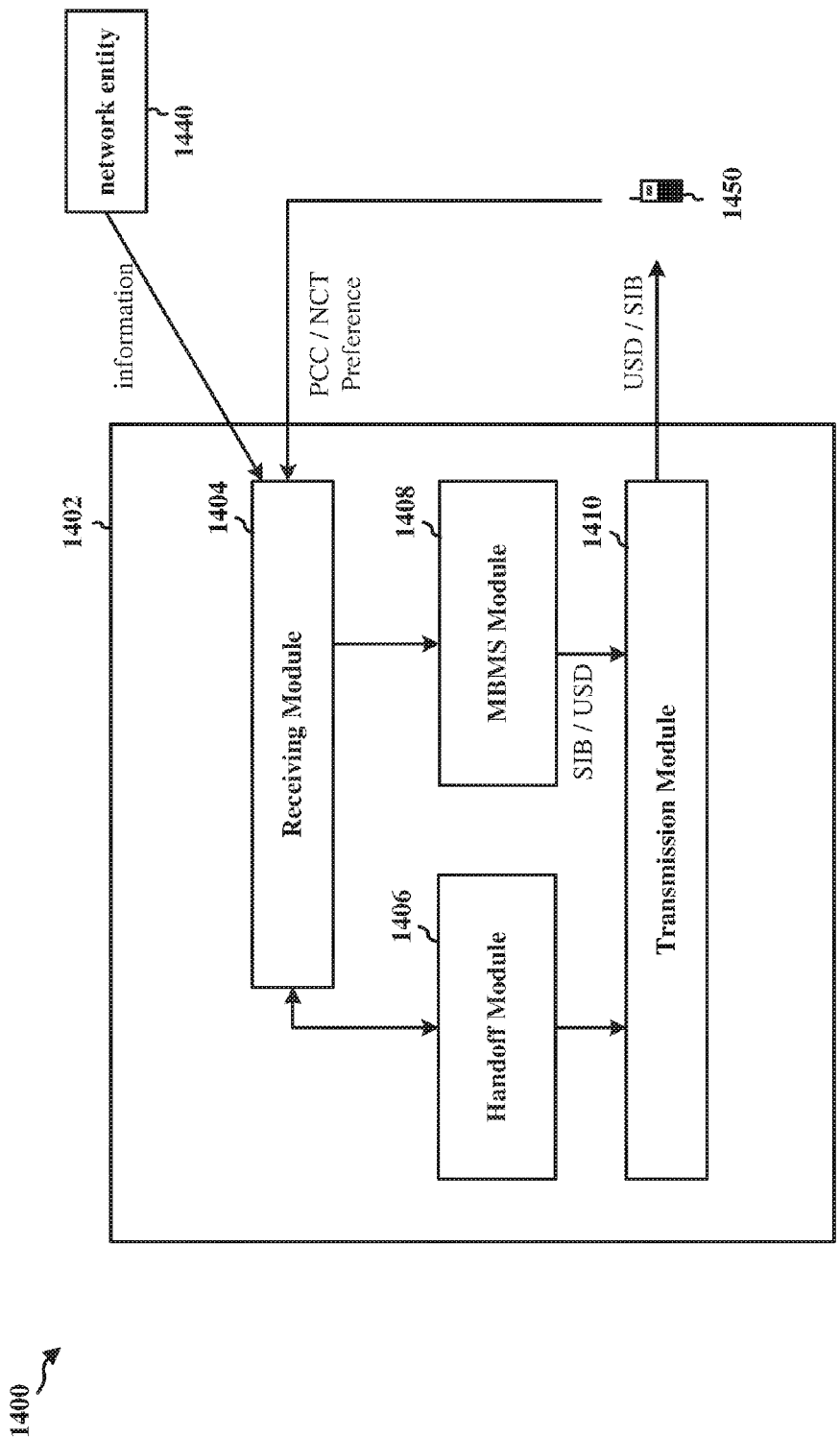
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a network entity (e.g., an eNB). The apparatus includes a receiving module 1404 that is configured to receive information indicating an available MBMS service, a non-self-standing carrier frequency on which the available MBMS service is provided, and one or more PCC frequencies to which the non-self-standing carrier frequency is attached. The information or a subset of the information (e.g., a USD) may be received from a BM-SC 1440. The receiving module 1404 is configured to provide the received information to an MBMS module 1408. The apparatus further includes a transmission module 1410 that is configured receive the information from the MBMS module 1408 and to send the information to a UE 1450.

The receiving module 1404 may be configured to receive a preference for one PCC frequency of the one or more PCC frequencies from the UE. The apparatus may further include a handoff module 1406 that is configured to hand off the UE to the one PCC frequency preferred by the UE. The receiving module 1404 may be configured to receive a preference for the non-self-standing carrier frequency from the UE. The handoff module 1406 may be configured to hand off the UE to a PCC frequency attached to the non-self-standing carrier frequency. The PCC frequency is one of the one or more PCC frequencies. The non-self-standing carrier frequency may be an NCT, a dedicated MBSFN carrier frequency, a DL only carrier frequency, or an SCC frequency that is not a PCC frequency for another UE.

The apparatus may include additional modules that perform each of the steps of the algorithm in the aforementioned flow chart of FIG. 11. As such, each step in the aforementioned flow charts of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
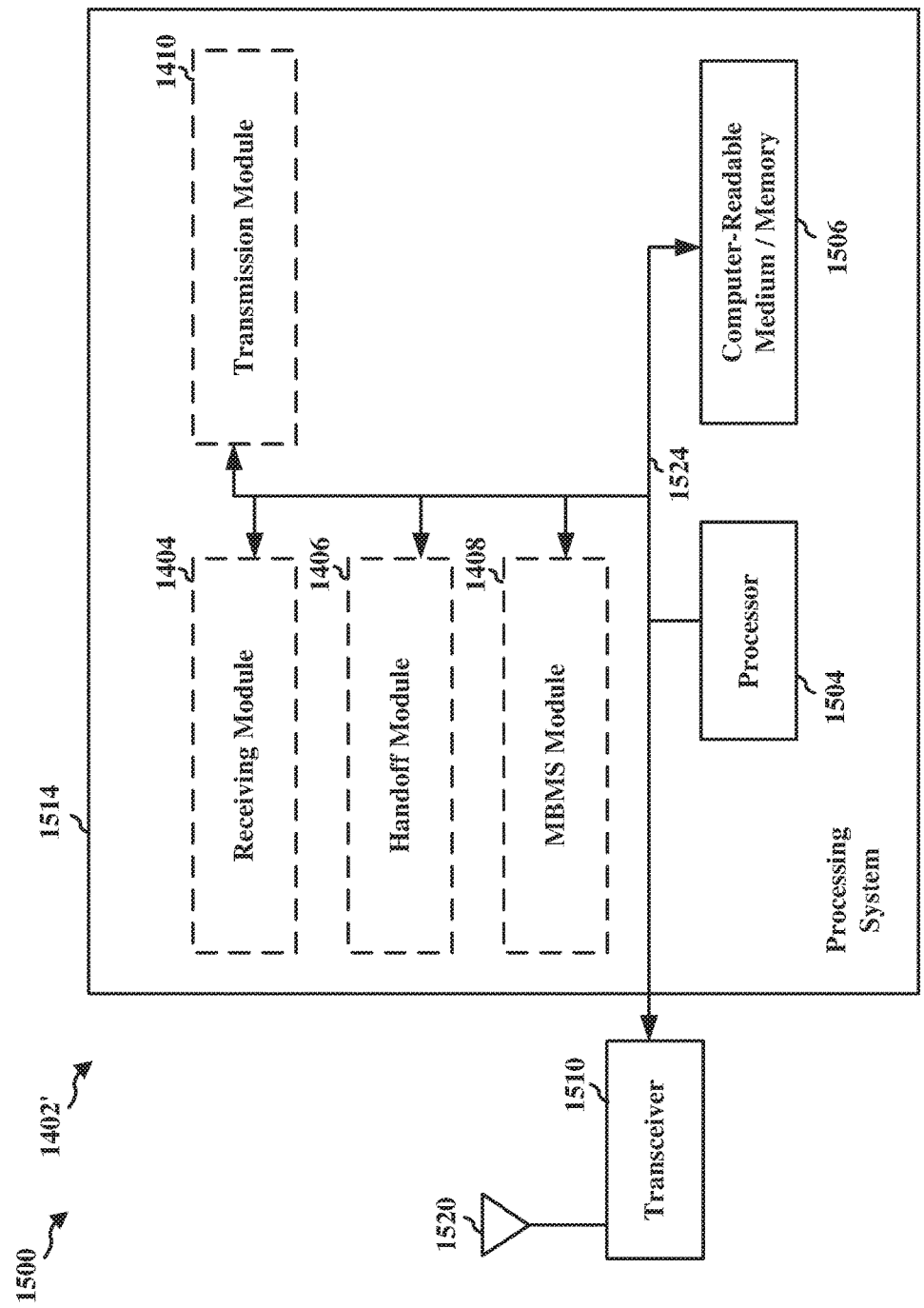
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, and 1410 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514. In addition, the transceiver 1510 receives information from the processing system 1514, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the modules 1404, 1406, 1408, and 1410. The modules may be software modules running in the processor 1504, resident/stored in the computer readable medium/memory 1506, one or more hardware modules coupled to the processor 1504, or some combination thereof. The processing system 1514 may be a component of the eNB 110 and may include the memory 642 and/or at least one of the TX processor 620, the RX processor 638, and the controller/processor 640.

In one configuration, the apparatus 1402/1402' for wireless communication includes means for receiving information indicating an available MBMS service, a non-self-standing carrier frequency on which the available MBMS service is provided, and one or more PCC frequencies to which the non-self-standing carrier frequency is attached. The apparatus further includes means for sending the information to a UE. The apparatus may further include means for receiving a preference for one PCC frequency of the one or more PCC frequencies from the UE. The apparatus may further include means for handing off the UE to the one PCC frequency preferred by the UE. The apparatus may further include means for receiving a preference for the non-self-standing carrier frequency from the UE. The apparatus may further include means for handing off the UE to a PCC frequency attached to the non-self-standing carrier frequency, the PCC frequency being one of the one or more PCC frequencies. The non-self-standing carrier frequency may be an NCT, a dedicated MBSFN carrier frequency, a DL only carrier frequency, or an SCC frequency that is not a PCC frequency for another UE.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 620, the RX Processor 638, and the controller/processor 640. As such, in one configuration, the aforementioned means may be the TX Processor 620, the RX Processor 638, and the controller/processor 640 configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication of a user equipment (UE), comprising:
    receiving first information indicating an available multimedia broadcast multicast service (MBMS) service, a non-self-standing carrier frequency on which the available MBMS service is provided, and one or more primary component carrier (PCC) frequencies to which the non-self-standing carrier frequency is attached;
    selecting, after receiving the first information, a preference for one PCC frequency of the one or more PCC frequencies in order to obtain second information for receiving the available MBMS service on the non-self-standing carrier frequency; and receiving the available MBMS service on the non-self-standing carrier frequency based on the obtained second information.

2. The method of claim 1, wherein the non-self-standing carrier frequency is a new carrier type (NCT) carrier frequency, dedicated Multicast Broadcast Single Frequency Network (MBSFN) carrier frequency, a downlink only carrier frequency, or a secondary component carrier frequency that is not a primary component carrier frequency for another UE.

3. The method of claim 1, wherein the first information is received in at least one of a user service description (USD) or a system information block (SIB).

4. The method of claim 3, wherein the SIB is a SIB 15 (SIB 15).

5. The method of claim 3, further comprising receiving the user service description (USD), wherein the USD indicates the one or more PCC frequencies to which the non-self-standing carrier frequency is attached.

6. The method of claim 3, further comprising receiving the SIB, wherein the SIB indicates the one or more PCC frequencies to which the non-self-standing carrier frequency is attached.

7. The method of claim 3, further comprising receiving the SIB, wherein the SIB indicates a plurality of frequencies and one or more PCC frequencies for each of the plurality of frequencies that are non-self-standing carrier frequencies.

8. The method of claim 3, further comprising receiving the USD and the SIB, wherein the USD indicates a first service area identity (SAI) associated with the available MBMS service, the SIB indicates a second SAI associated with the non-self-standing carrier frequency and the one or more PCC frequencies to which the non-self-standing carrier frequency is attached, and the preference for the one PCC frequency is selected when the first SAI and the second SAI are the same.

9. The method of claim 1, wherein the selecting the preference for the one PCC frequency is based on unicast measurements when the one or more PCC frequencies is greater than one.

10. The method of claim 1, wherein the selecting the preference for the one PCC frequency comprises prioritizing the one PCC frequency when the UE is in a radio resource control (RRC) idle state.

11. The method of claim 1, wherein the selecting the preference for the one PCC frequency comprises sending an MBMS interest indication message indicating the one PCC frequency or the non-self-standing carrier frequency when the UE is in a radio resource control (RRC) connected state.

12. The method of claim 11, wherein the MBMS interest indication message indicates the one PCC frequency when the UE is in an RRC connected state.

13. A method of wireless communication of a network entity, comprising:
receiving information indicating an available multimedia broadcast multicast service (MBMS) service, a non-self-standing carrier frequency on which the available MBMS service is provided, and one or more primary component carrier (PCC) frequencies to which the non-self-standing carrier frequency is attached; and
sending the information to a user equipment (UE).

14. The method of claim 13, further comprising receiving a preference for one PCC frequency of the one or more PCC frequencies from the UE.

15. The method of claim 14, further comprising handing off the UE to the one PCC frequency preferred by the UE.

16. The method of claim 13, further comprising receiving a preference for the non-self-standing carrier frequency from the UE.

17. The method of claim 16, further comprising handing off the UE to a PCC frequency attached to the non-self-standing carrier frequency, the PCC frequency being one of the one or more PCC frequencies.

18. The method of claim 13, wherein the non-self-standing carrier frequency is a new carrier type (NCT) carrier frequency, dedicated Multicast Broadcast Single Frequency Network (MBSFN) carrier frequency, a downlink only carrier frequency, or a secondary component carrier frequency that is not a primary component carrier frequency for another UE.

19. An apparatus for wireless communication, the apparatus being a user equipment (UE), comprising:
a memory; and
at least one processor coupled to the memory and configured to:
receive first information indicating an available multimedia broadcast multicast service (MBMS) service, a non-self-standing carrier frequency on which the available MBMS service is provided, and one or more primary component carrier (PCC) frequencies;
select, after reception of the first information, a preference for one PCC frequency of the one or more PCC frequencies in order to obtain second information for receiving the available MBMS service on the non-self-standing carrier frequency; and
receive the available MBMS service on the non-self-standing carrier frequency based on the obtained second information.

20. The apparatus of claim 19, wherein the non-self-standing carrier frequency is a new carrier type (NCT) carrier frequency, dedicated Multicast Broadcast Single Frequency Network (MBSFN) carrier frequency, a downlink only carrier frequency, or a secondary component carrier frequency that is not a primary component carrier frequency for another UE.

21. The apparatus of claim 19, wherein the first information is received in at least one of a user service description (USD) or a system information block (SIB).

22. The apparatus of claim 21, wherein the SIB is a SIB 15 (SIB15).

23. The apparatus of claim 21, wherein the at least one processor is further configured to receive the user service description (USD), wherein the USD indicates the one or more PCC frequencies to which the non-self-standing carrier frequency is attached.

24. The apparatus of claim 21, wherein the at least one processor is further configured to receive the SIB, wherein the SIB indicates the one or more PCC frequencies to which the non-self-standing carrier frequency is attached.

25. An apparatus for wireless communication, the apparatus being a network entity, comprising:
a memory; and
at least one processor coupled to the memory and configured to:
receive information indicating an available multimedia broadcast multicast service (MBMS) service, a non-self-standing carrier frequency on which the available MBMS service is provided, and one or more primary component carrier (PCC) frequencies to which the non-self-standing carrier frequency is attached; and
send the information to a user equipment (UE).

26. The apparatus of claim 25, wherein the at least one processor is further configured to receive a preference for one PCC frequency of the one or more PCC frequencies from the UE.

27. The apparatus of claim 26, wherein the at least one processor is further configured to hand off the UE to the one PCC frequency preferred by the UE.

28. The apparatus of claim 25, wherein the at least one processor is further configured to receive a preference for the non-self-standing carrier frequency from the UE.

29. The apparatus of claim 28, wherein the at least one processor is further configured to hand off the UE to a PCC frequency attached to the non-self-standing carrier frequency, the PCC frequency being one of the one or more PCC frequencies.

30. The apparatus of claim 25, wherein the non-self-standing carrier frequency is a new carrier type (NCT) carrier frequency, dedicated Multicast Broadcast Single Frequency Network (MBSFN) carrier frequency, a downlink only carrier frequency, or a secondary component carrier frequency that is not a primary component carrier frequency for another UE.

\* \* \* \* \*